United States Patent [19]

Cornforth et al.

[11] Patent Number: 5,276,918

[45] Date of Patent: Jan. 4, 1994

[54] MOBILE RADIO TELEPHONE WITH BOOSTER UNIT

[75] Inventors: Philip E. Cornforth, Gerrards Cross; Robert O. Bristow, Basingstoke; Hilary J. Cross, Camberley, all of England

[73] Assignee: Orbitel Mobile Communications Limited, Bracknell, United Kingdom

[21] Appl. No.: 791,958

[22] Filed: Nov. 13, 1991

[30] Foreign Application Priority Data

Nov. 16, 1990 [GB] United Kingdom ............... 9025007

[51] Int. Cl.$^5$ ................................ H04B 1/38
[52] U.S. Cl. ........................ 455/89; 455/127
[58] Field of Search ............ 455/89, 127, 88, 11.1, 455/101, 132-; 379/58, 59

[56] References Cited

U.S. PATENT DOCUMENTS

| | | | |
|---|---|---|---|
| 4,636,741 | 1/1987 | Mitzlaff | 455/126 |
| 4,829,591 | 5/1989 | Hashimoto et al. | 455/89 |
| 5,045,823 | 9/1991 | Nichols, III | 455/6.1 |
| 5,048,117 | 9/1991 | Aisaka et al. | 455/127 |
| 5,054,115 | 10/1991 | Sawa et al. | 455/89 |
| 5,146,614 | 9/1992 | Furuno | 455/89 |

FOREIGN PATENT DOCUMENTS

| | | |
|---|---|---|
| 0246658 | 11/1987 | European Pat. Off. . |
| 0310318 | 4/1989 | European Pat. Off. . |
| 0338834 | 10/1989 | European Pat. Off. . |
| 0048627 | 3/1985 | Japan ............. 455/134 |
| 2204214 | 11/1988 | United Kingdom . |

Primary Examiner—Reinhard J. Eisenzopf
Assistant Examiner—Nguyen Vo
Attorney, Agent, or Firm—Leydig, Voit & Mayer

[57] ABSTRACT

A mobile radio telephone includes a hand-portable unit 1 and a booster unit 3. A coaxial cable 25 is arranged to produce a link between the intermediate frequency signals produced by the booster unit and RF signals produced by the hand-portable unit 1.

13 Claims, 1 Drawing Sheet

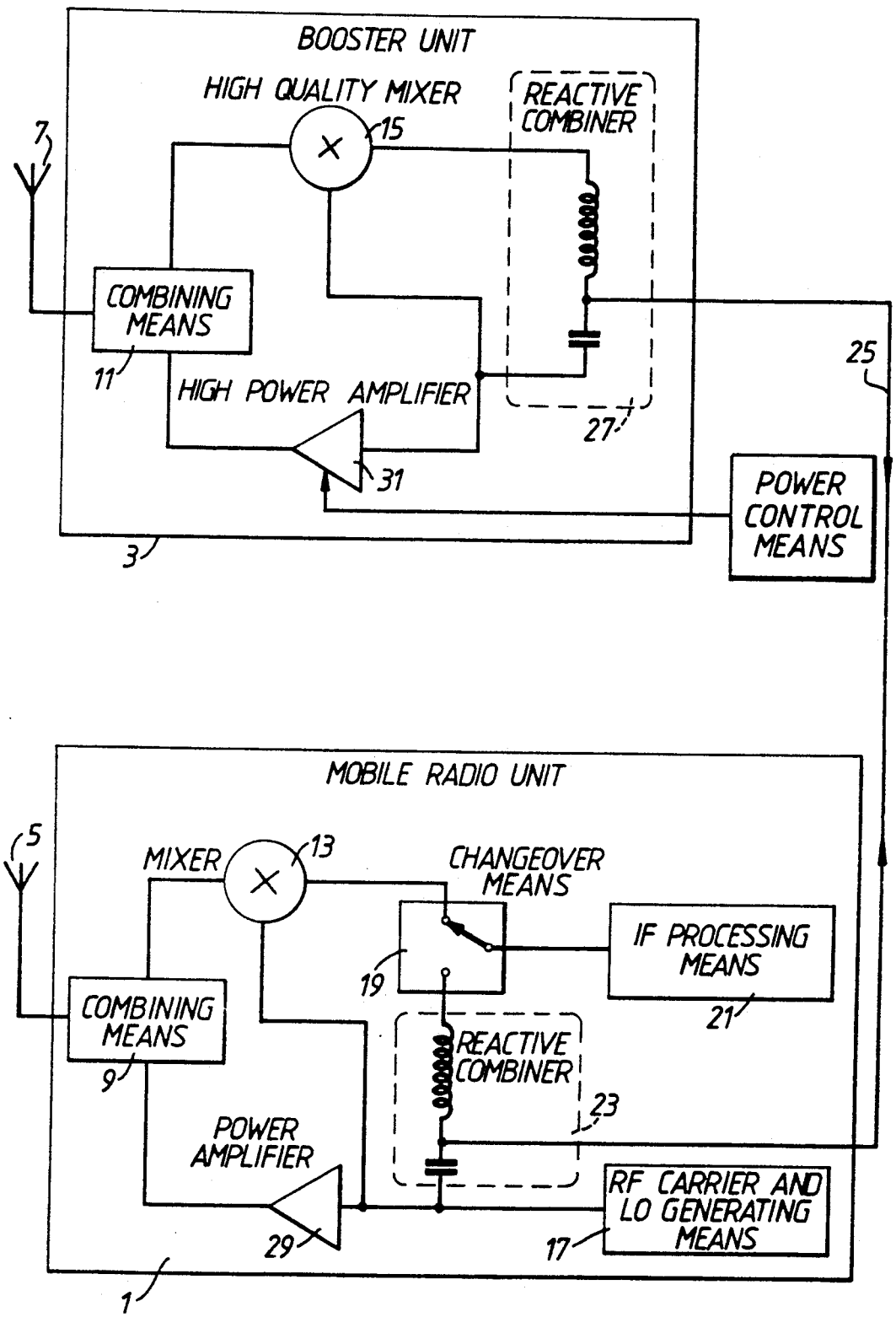

MOBILE RADIO TELEPHONE WITH BOOSTER UNIT

BACKGROUND OF THE INVENTION

1. Field of the Invention

This invention relates to mobile radio telephones. The invention has particular, although not exclusive, relevance to mobile radio telephones for use in the Pan European cellular radio network, commonly referred to as the Groupe Speciale Mobile (GSM) system.

Mobile radio telephones have to meet conflicting requirements of compact size, long battery life and high transmitter power. Furthermore, to comply with the GSM specification, mobile radio telephones must fit into one of a number of specified classes. These classes link transmitter power capability to the dynamic range performance of the receiver, and thus any increase in the power for the transmitter will change the specification of the performance of the receiver.

2. Description of the Prior Art

Manufacturers of mobile radio telephones for use in the GSM system may produce a range of products which meet the requirements of mobile radio telephones for use in the GSM system. At one extreme, the telephone may take the form of a hand-portable unit which is designed to be as small and light as possible, this necessarily being at the expense of transmitter power and receiver performance. At the other extreme the telephone may be mounted in a car, the telephone using the car battery, or a large independent NiCd battery to give high transmitter output power, the result thus being a larger unit which is less portable. In order to derive the benefits of both of these extremes, a hand-portable unit may be connected to a unit called a power booster which is mounted, for example, in the boot of a car. This then enables the hand-portable unit to have the performance of a telephone mounted in a car when the hand-portable unit is connected to the booster unit. However, it is necessary to know the effect of the booster unit on the receiver in the hand-portable unit, so as to be able to accurately measure the magnitude of the received signal. In known mobile radio telephones, for example as shown in European Patent Application EP-0338834, signals are routed between the transceiver incorporated in the hand-portable unit and the power booster at the final signal frequency. The main unknown in the prediction of the effect of the booster unit on the receiver in the hand-portable unit is thus the length, and hence the losses produced in the cable connecting the hand-portable unit and the booster through which radio frequency signals at the carrier frequency are transmitted.

SUMMARY OF THE INVENTION

It is an object of the present invention to provide a mobile radio telephone incorporating a mobile unit and a booster unit, wherein the above disadvantages are minimised.

According to the present invention, there is provided a mobile radio telephone including a portable unit and a mobile radio telephone including a portable unit and a booster unit, the portable unit and the booster unit each being effective to receive and transmit signals, means for producing intermediate frequency signals in the portable unit from signals received by the portable unit, the telephone being characterised in that it includes means for producing intermediate frequency signals in the booster unit from signals received by the booster unit, and means for enabling the portable unit to receive the intermediate frequency signals produced by the booster unit.

Thus in a mobile radio telephone in accordance with the invention, signals are transmitted between the booster unit and the portable unit at intermediate frequencies, leading to minimal losses in the cable connecting the two units.

Preferably, the portable unit includes means for producing signals which may be used by the booster unit to produce intermediate frequency signals.

Preferably, the mobile radio telephone includes an intermediate frequency signal processing means, and changeover means effective to allow the intermediate frequency signal processing means to process intermediate frequencies derived from signals received from either the portable unit or the booster unit. Thus in a mobile radio telephone in accordance with the invention, duplication of circuitry in the booster unit and portable unit is minimised, thus leading to a size and cost saving for the telephone.

BRIEF DESCRIPTION OF THE DRAWING

One embodiment of a mobile radio telephone, in accordance with the invention, will now be described, by way of example only, with reference to the accompanying drawing which is a block schematic diagram of the telephone.

DESCRIPTION OF THE PREFERRED EMBODIMENT

Referring to the drawing, the mobile radio telephone to be described is intended for use in the GSM system. The telephone includes a hand-portable unit, indicated as 1, and a booster unit, indicated as 3, located, for example, in the boot of a car (not shown). The hand-portable unit 1 is designed to be capable of independent operation, but contains components which are, on the whole, of lower performance capability than those incorporated in the booster unit 3.

Both the hand-portable unit 1 and the booster unit 3 incorporate respective antennae 5,7. The hand-portable unit 1 and the booster unit 3 also both include respective combiner means 9,11 responsive to signals received by the respective antennae 5,7 and designed to allow the use of a single antenna 5 or 7 to both transmit and receive signals. The combining means, 9 or 11, is implemented in a manner which will be known to a person skilled in the art of mobile radio telephones with, for example, a combination of filters or switch elements.

The outputs of the combining means 9 and 11 are connected to respective mixers 13 or 15, a filter (not shown) being incorporated in the respective signal paths between the combining means 9 or 11 and the mixer 13 or 15, if necessary. The mixer 13 incorporated in the hand-held unit 1 is chosen to meet the requirements of low power consumption, cost and size. The mixer 15 incorporated in the booster unit 3, on the other hand, is a high quality mixer providing the high performance specified in the GSM specification when a high power transmitter is used.

In the hand-portable unit 1, an input to the mixer 13 is provided from a signal generating means 17 incorporating a local oscillator and a radio frequency (RF) carrier signal generating means. The output of the mixer 13 is connected through a change-over switch 19 to intermediate frequency (IF) processing circuitry indicated as unit 21, this circuitry including channel selectivity and demodulating functions and representing the rest of the receiver signal path which is effective to perform all further processing of signals received by the antennae 5,7. A third terminal of the switch 19 is connected to a reactive combiner 23 comprising a simple inductive and capacitive network, the reactive combiner 23 being connected via a coaxial cable 25 to a corresponding reactive combiner 27 in the booster unit 3, the combiner 27 being connected across two terminals of the mixer 15.

The coaxial cable 25 is also effective to enable signals generated by the local oscillator in the signal generating means 17 to be transmitted to the booster unit 3. This enables the booster unit 3 to generate its own IF signals from RF signals received by the antenna 7.

Both units 1,3 incorporate respective power amplifiers 29,31. The power amplifier 29 incorporated in the hand-portable unit 1 is designed to generate typically 3 watts of carrier signal power in pulses as specified in the GSM specification, the pulse generation being controlled in the hand-portable unit. The power amplifier 31 incorporated in the booster unit 3 is a high power amplifier having a variable power control, the amplifier 31 being capable of generating typically 12 watts of carrier signal power in pulses as specified in the GSM specification, the generation of these pulses and the power level of the power amplifier 31 being controlled in the hand-portable unit 1 by means of a conventional data link. The amplifier 31 includes bandpass and harmonic filters (not shown) effective to remove spurious signals.

Thus, in use of the telephone, the mixers 13,15 produce respective IF signals from RF signals received by the antennae 5,7. The hand-portable unit 1 then processes either its own IF signals or the IF signals generated by the booster unit 3 dependent upon the position of the switch 19, the signals communicating by means of the cable 25. In the GSM system simultaneous transmission and reception is not required, the signal generating means 17 can be used to generate both an RF signal for use as a transmitted carrier signal when the antennae 5,7 are to be used in a transmission mode, and a local oscillator when the antennae 5,7 are to be used in a receiving mode.

The power control system for the power amplifier 31 in the booster unit 3 is designed to tolerate relatively large changes in the signal level of the RF carrier signals produced by the signal generating means 17. Thus frequency response and cable loss effects are minimised when the telephone is used in a transmit mode. Furthermore as the gain profile of the booster unit 3 will maintain a relatively high level up to the hand-portable unit 1 when the booster unit 3 is operating in a receiver mode, and the IF processing means 21 within the hand-portable unit 1 contains all the necessary channel filtering, noise picked up on the cable 25 will be minimised when the telephone is used in a receiver mode.

It will be seen that as the intermediate frequencies produced by the hand portable unit 1 and the booster unit 3 are a decade or more away from the RF frequency, RF and IF signals can be added using only a single inductive element and a single capacitive element in each combiner 23,27. The quality of the components in the combiners 23,27 is not critical, and it is not necessary to closely define the values of the components. Whilst such simple inductive and capacitive networks have adequate performance, performance may be improved by means of delta networks in which respective resistive elements are connected across the inductor and capacitor in each of the combiners 23,27. A simple wire link may be used to connect the booster unit 3 and the hand-portable unit 1, the booster unit 3 converting the performance of the hand-portable unit 1 to that of a higher performance mobile unit. This enables improved receiver performance as well as improved transmitter output power, and conforms to the GSM requirements for a mobile telephone in both the hand-portable unit and the booster unit. For example, the hand-portable unit may be designed so as to conform to GSM class 4 requirements when the unit 1 is used independently, whilst, when connected to the booster unit via the cable 25, it conforms to GSM class 1. Duplication of functions in the booster unit 3 and the hand-portable unit 1 is minimised and thus there is a cost saving. It will be appreciated that usually a limiting factor in receiver performance is the input mixer used to convert the RF carrier signal to an intermediate frequency. The provision of the high quality mixer in the booster unit 3 thus greatly improves performance of the telephone.

It will also be appreciated that the telephone only requires one RF cable 25 connecting the booster unit to the hand-portable unit 1. Variable lengths of the cable 25 are allowed without requiring adjustment of the circuits incorporated in either of the units 1,3. As signals derived from the signals received by the antennae 5,7 are communicated between the units 1,3 at intermediate frequencies, minimal losses within the cable 25 will be experienced. Furthermore, low signal levels in the cable 25 are used, thus reducing the danger of interference. Bandpass filtering at either end of the cable 25 will reduce interfence pick-up. The coaxial cable 25 may also be used for DC transmission as well as signals at RF and IF. Thus the booster unit 3 can be used to supply power to the hand-portable unit 1, for example, so as to recharge batteries (not shown) in the hand-held portable unit 1.

It will be appreciated that whilst the RF carrier and local oscillator signal generating means are shown incorporated in the hand-portable unit 1, these may alternatively or additionally be incorporated in the booster unit 3.

What we claim is:

1. A mobile radio telephone including a portable unit and a booster unit, and operable in two modes, a first mode in which the portable unit is used to receive and transmit signals and a second mode in which the portable unit and booster unit are used in combination to receive and transmit signals, said portable unit comprising first receiver means for producing intermediate frequency signals in said portable unit from signals received by said portable unit when operating the mobile radio telephone in said first mode;

said booster unit comprising second receiver means for producing intermediate frequency signals in said booster unit from signals received by said booster unit; and link means for providing a transmission path between said portable unit and booster unit, to enable said portable unit to receive the intermediate frequency signals produced by said second receiver means when operating the mobile radio telephone in the second mode;

said first and said second receiver means each including a mixer for producing said intermediate frequency signals wherein said mixer of said second receiver means is of a higher specification than said mixer of said first receiver means.

2. A mobile radio telephone according to claim 1 in which said portable unit includes means for producing signals which are transmitted along said transmission path to said booster unit when operating the mobile radio telephone in the second mode to be used by said booster unit to produce said intermediate frequency signals.

3. A mobile radio telephone according to claim 1 in which both said portable unit and said booster unit include respective reactive combiner means effective to receive signals transmitted along the transmission path from the other unit.

4. A mobile radio telephone according to claim 3 in which each of said reactive combiner means consists of a single capacitive and a single inductive element.

5. A mobile radio telephone according to claim 1 including an intermediate frequency signal processing means, and changeover means effective to allow said intermediate frequency signal processing means to process intermediate frequency signals produced by said first or said second receiving means.

6. A mobile radio telephone according to claim 1 in which said booster unit includes a variable gain power amplifier having a signal input for receiving signals, an output for amplified signals and a power control input, and an antenna connected to said power amplifier output to transmit the amplified signals,
said portable unit being connected to said signal input to provide signals to be amplified, and including power control means connected to said power control input and providing power control signals thereon to control the gain and thus the power output level of said power amplifier.

7. A mobile radio telephone according to claim 1 in which said link means is also effective to transmit DC power from said booster unit to said portable unit.

8. A mobile radio telephone including a portable unit and a booster unit, and operable in two modes, a first mode in which the portable unit is used to receive and transmit signals and a second mode in which the portable unit and booster unit are used in combination to receive and transmit signals,
said portable unit comprising first receiver means for producing intermediate frequency signals in said portable unit from signals received by said portable unit when operating the mobile radio telephone in said first mode;
said booster unit comprising second receiver means for producing intermediate frequency signals in said booster unit from signals received by said booster unit; and
link means for providing a transmission path between said portable unit and booster unit, to enable said portable unit to receive the intermediate frequency signals produced by said second receiver means when operating the mobile radio telephone in the second mode,
said portable unit and said booster unit including respective reactive combiner means effective to receive signals transmitted along said transmission path from the other unit and in which each of said reactive combiner means consists of a single capacitive and a single inductive element.

9. A mobile radio telephone according to claim 8 in which said portable unit includes means for producing signals which are transmitted along said transmission path to said booster unit when operating the mobile radio telephone in the second mode to be used by said booster unit to produce intermediate frequency signals.

10. A mobile radio telephone according to claim 8 including an intermediate frequency signal processing means, and changeover means effective to allow said intermediate frequency signal processing means to process intermediate frequency signals produced by said first or said second receiving means.

11. A mobile radio telephone according to claim 8 in which said booster unit includes a variable gain power amplifier having a signal input for receiving signals, an output for amplified signals and a power control input, and an antenna connected to said power amplifier output to transmit the amplified signals,
said portable unit being connected to said signal input to provide signals to be amplified, and including power control means connected to said power control input and providing power control signals thereon to control the gain and thus the power output level of said power amplifier.

12. A mobile radio telephone according to claim 8 in which said link means is also effective to transmit DC power from said booster unit to said portable unit.

13. A mobile radio telephone according to claim 8 in which said first and said second receiver means each include a mixer for producing said intermediate frequency signals, said mixer of said second receiver means being of a higher specification than said mixer of said first receiver means.

* * * * *